(12) United States Patent  
Venkatasubramanian et al.

(10) Patent No.: US 9,465,669 B2  
(45) Date of Patent: Oct. 11, 2016

(54) NUMA SCHEDULING USING INTER-VCPU MEMORY ACCESS ESTIMATION

(71) Applicant: VMware, Inc., Palo Alto, CA (US)

(72) Inventors: Rajesh Venkatasubramanian, San Jose, CA (US); Puneet Zaroo, Santa Clara, CA (US); Alexandre Milouchev, Brussels (BE)

(73) Assignee: VMware, Inc., Palo Alto, CA (US)

( * ) Notice: Subject to any disclaimer, the term of this patent is extended or adjusted under 35 U.S.C. 154(b) by 182 days.

(21) Appl. No.: 14/201,787

(22) Filed: Mar. 7, 2014

(65) Prior Publication Data

US 2015/0052287 A1 Feb. 19, 2015

Related U.S. Application Data

(60) Provisional application No. 61/865,571, filed on Aug. 13, 2013.

(51) Int. Cl.
| | |
|---|---|
| *G06F 12/00* | (2006.01) |
| *G06F 9/50* | (2006.01) |
| *G06F 12/10* | (2016.01) |
| *G06F 3/06* | (2006.01) |
| *G06F 12/06* | (2006.01) |
| *G06F 12/02* | (2006.01) |
| *G06F 12/08* | (2016.01) |

(52) U.S. Cl.
CPC .......... *G06F 9/5083* (2013.01); *G06F 9/5033* (2013.01); *G06F 12/0891* (2013.01); *G06F 3/0604* (2013.01); *G06F 3/0614* (2013.01); *G06F 3/0662* (2013.01); *G06F 3/0665* (2013.01); *G06F 12/0292* (2013.01); *G06F 12/0638* (2013.01); *G06F 12/0868* (2013.01); *G06F 12/10* (2013.01); *G06F 12/1009* (2013.01); *G06F 12/1072* (2013.01); *G06F 2212/1016* (2013.01); *G06F 2212/152* (2013.01); *G06F 2212/2542* (2013.01)

(58) Field of Classification Search
CPC .. G06F 3/0604; G06F 3/0614; G06F 3/0662; G06F 3/0665; G06F 3/0671; G06F 12/0292; G06F 12/0638; G06F 12/0868; G06F 12/1009; G06F 12/1072
USPC ........... 711/6, 119, 124, 141, 150, 203, 207; 712/12, 14, 28, 225; 718/104, 105; 709/218, 226
See application file for complete search history.

(56) References Cited

U.S. PATENT DOCUMENTS

| | | | | |
|---|---|---|---|---|
| 6,549,930 | B1* | 4/2003 | Chrysos | G06F 9/4881 718/104 |
| 7,100,096 | B2* | 8/2006 | Webb, Jr. | G06F 11/0724 714/49 |
| 7,213,087 | B1* | 5/2007 | Bertone | H04L 47/39 370/229 |
| 7,756,943 | B1* | 7/2010 | Wong | G06F 9/544 709/212 |
| 2003/0009640 | A1* | 1/2003 | Arimilli | G06F 12/0888 711/147 |
| 2004/0177184 | A1* | 9/2004 | Steinman | G06F 13/4059 710/100 |
| 2007/0083728 | A1* | 4/2007 | Nijhawan | G06F 9/5016 711/170 |

(Continued)

*Primary Examiner* — Reba I Elmore

(57) ABSTRACT

In a system having non-uniform memory access architecture, with a plurality of nodes, memory access by entities such as virtual CPUs is estimated by invalidating a selected sub-set of memory units, and then detecting and compiling access statistics, for example by counting the page faults that arise when any virtual CPU accesses an invalidated memory unit. The entities, or pairs of entities, may then be migrated or otherwise co-located on the node for which they have greatest memory locality.

25 Claims, 6 Drawing Sheets

(56) References Cited

U.S. PATENT DOCUMENTS

| | | | |
|---|---|---|---|
| 2012/0174117 A1* | 7/2012 | Jula | G06F 9/5088 718/105 |
| 2013/0067135 A1* | 3/2013 | Pandey | G06F 9/4856 711/6 |
| 2013/0073730 A1* | 3/2013 | Hansson | G06F 9/5044 709/226 |
| 2013/0290669 A1* | 10/2013 | Lowe | G06F 12/0223 711/206 |
| 2014/0365738 A1* | 12/2014 | Hod | G06F 12/0284 711/160 |

* cited by examiner

NUMA SCHEDULING USING INTER-VCPU MEMORY ACCESS ESTIMATION

CROSS-REFERENCE TO RELATED APPLICATIONS

This application claims priority of U.S. Provisional Patent Application No. 61/865,571, filed 13 Aug. 2013, which is incorporated herein by reference in its entirety.

FIELD OF THE INVENTION

This invention relates to memory management in systems that have a non-uniform memory access (NUMA) architecture.

BACKGROUND

An almost universal goal of computer scientists and engineers is to increase processing speed. One way to do this is to have more processors at work simultaneously, hence, developments such as parallel and multi-core (such as SMP—Symmetric Multi-Processing) architectures. FIG. 1 illustrates a simplified schematic of a quad-core SMP system on a single socket 10, in which four processor cores 20a, . . . , 20d, share a set of memory devices 40i, . . . , 40iv, with memory access being coordinated by a memory controller 30. In other words, as FIG. 1 illustrates, more than one processor (or, equivalently, processor core) may contend for access to the shared resource, in this case, memory (RAM).

Since the switch to ubiquitous multi-core architectures, it has become clear that scalability lies in multithreaded programming. It is not uncommon, for example, for workloads to run dozens of threads executing in parallel. On the operating system level, there may be hundreds of processes executing at the same time, taking advantage of the multiple cores available on the CPU (or multiple CPUs in such architectures), and of technology such as HyperThreading, which allows for a single physical core to expose multiple logical cores to the system to maximize its utilization. In recent years, however, the single memory bus available in traditional SMP systems has increasingly been regarded as a major performance bottleneck. In other words, contention for the single shared resource has caused performance to suffer.

One attempt to alleviate the memory bottleneck involves complex cache hierarchies in hardware. Despite this, many workloads are still reliant on memory, which remains the main cause of execution slow-down. As a result of high access latency, a CPU can thus become "starved for memory". In other words, no further instructions can be executed until data has been retrieved from memory. While already a concern on single-core CPUs, this problem is all the worse in multi-core systems, in which not one but many cores can stall at once waiting for memory access due to access latency or the limited bandwidth available on the memory bus. This issue undermines the benefits of concurrent execution, and only worsens with the increase in the number of cores on a CPU. Therefore, a new, more scalable architecture was necessary to extract the full benefits of multi-core parallelism.

This need led to the rise of non-uniform memory access (NUMA) architectures. These systems are more scalable, as they consist of multiple sockets or "nodes," each of which has a possibly multi-core CPU, a local memory controller and local RAM. Nodes are linked through high-speed interconnects. FIG. 2 illustrates a simplified four-node (Socket 0, Socket 1, Socket 2, Socket 3) NUMA system, in which each node has the general structure of the single node shown in FIG. 1, and in which the different socket pairs are linked via respective high-speed interconnects 200a, . . . , 200d.

To understand the concept of NUMA, imagine students sitting studying at respective tables in a library, where each table may have room for more than one student to sit: If the books on each table are the ones that the students sitting there most need to read, then there will be less need to walk around to get them. All books will be available, but a student might need to walk to some other table to get a book that isn't at his own table. It will be faster to get books from adjacent tables, and will take longer if he must walk to tables farther away. Depending on the library, he might even need to go to the general stacks to get still other books, or request assistance from a librarian.

Similarly, the general idea behind NUMA systems is that memory assigned to each node should ideally contain the information most needed by the processor cores in that node; thus, the most needed memory contents will be "local" for those nodes and can be accessed faster, using a bus associated with each respective socket/node. Information stored in the memory associated with other nodes is "remote"—it can be accessed, but more slowly. If a given node is connected to another by one of the high-speed interconnects, then information can be transferred between the memory associated with the respective nodes faster than otherwise, but still not as fast as within a node. In some cases, a core in one node needs access to memory associated with a node with which its node does not have a direct high-speed interconnect. If no general bus is included, then a "hop" will be required via nodes that are interconnected. For example, Socket 0 in FIG. 2 could get data from the RAM associated with Socket 3 by hopping via Socket 2. In short, in a NUMA system, processors can access the memory local to their own respective nodes faster than memory local to another processor or memory shared between processors. Despite being distributed throughout the system, memory in NUMA is thus still typically presented to the programmer as a global, shared address space: Any memory location can be accessed by any CPU, although some accesses (local ones) can complete faster than others.

Note that high-speed interconnects could also be implemented for each diagonal pair of sockets, that is, connecting Socket 0 with Socket 3, and Socket 1 with socket 2. This would eliminate the "hop" (with performance degradation) between otherwise non-interconnected nodes. Interconnects are hardware structures, however, so each such interconnect complicates the architecture. In order to extract performance benefits from the non-uniform memory layout, it is therefore important to maximize memory locality on such systems—high numbers of remote accesses can severely degrade performance, in comparison to traditional SMP systems.

As with regular SMP, memory performance in a NUMA system may be improved by the use of a hierarchy of caches at each node. Note that initial NUMA designs did not implement cache coherence across nodes, which meant processors were not guaranteed to retrieve the latest updated data in case the memory reference they were accessing was found in their local cache, but had already been modified on another node. Although easier to design and manufacture, this model was found to prohibitively increase the complexity of programming for such systems. As a result, nowadays NUMA machines are typically (but not necessarily) implied to be ccNUMA (cache-coherent NUMA).

Under NUMA, memory references from a CPU's point of view can be divided into remote ones, which reside on other nodes, and local ones, which are stored in the CPU's local bank. When a CPU accesses memory, it first queries its local caches. If no level in the hierarchy contains the required data and the address is local, it will be retrieved from the local RAM. On the other hand, if it is remote, the CPU has to stall while memory is accessed over the high-speed interconnect. (Note that a CPU might also stall even for local memory accesses.) The non-uniform characteristics for NUMA systems are due to the increased latency penalty incurred when going over the interconnect.

Clearly, NUMA will favor some types of workloads over others. For example, workloads with small working sets that can be mostly contained in caches should generally not experience substantial slowdowns due to the distributed nature of the system. For memory-intensive workloads, however, good performance can typically be achieved only if the data can be spread across the system such that each processor can load data only (or at least predominantly) from its local bank and thus avoid expensive (time-consuming) remote accesses. Unfortunately, due to the dynamics of CPU scheduling, load-balancing, memory allocations, and several other factors, achieving sufficient locality of accesses in the general case is difficult. Different operating systems have taken different approaches.

With NUMA, the proper "positioning" of data and code in the overall memory system thus becomes essential. In particular, the number of remote accesses by each processor should ideally be minimized, or else not only would any potential advantages of NUMA be negated, but performance might suffer even further than on a symmetric architecture due to the high interconnect latency. This "locality" problem can be addressed in a variety of ways, none of which are mutually exclusive.

A third approach would be to include optimizations at the operating system level. This is a particularly attractive option, as the OS controls every layer of execution and has full knowledge of the topology it runs on, as well as the current state of the system in traditional SMP systems (the most common form of UMA, or Uniform Memory Access architecture), all processors (or cores) share one memory bus, and therefore have uniform access time to all of memory. The main focus of modern operating systems' memory management modules is their paging policy: which pages to fetch into memory, which frame to load them into, and which pages to swap to disk in order to make room for new ones. The most attention is typically given to the algorithm for selection of pages to swap in/out, to reduce the occurrence of problems such as thrashing, where the same pages continuously get pushed to disk and accessed soon afterwards, bringing about a heavy performance hit.

With the advent of NUMA, new aspects need to be considered. For example, the importance of memory placement has risen dramatically, so which pages to fetch matters just as much as where in memory these pages are loaded. What is more, it is no longer enough to fetch a page and keep it in memory if it is accessed frequently. Often, processes will be scheduled to run on various nodes rather than stick to a single one, depending on the load distribution in the system; consequently, memory that was once local to a process may suddenly become remote. Dynamic detection of changes in locality and proactive migration of pages, as well as locality-aware scheduling, are therefore needed to keep performance high.

DETAILED DESCRIPTION

Figure 1:
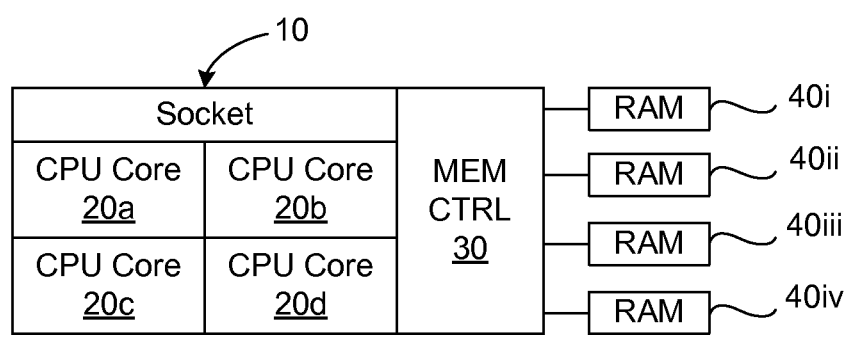
FIG. 1 illustrates a simplified schematic of a quad-core of a Symmetric Multi-Processing (SMP) architecture.
Figure 2:
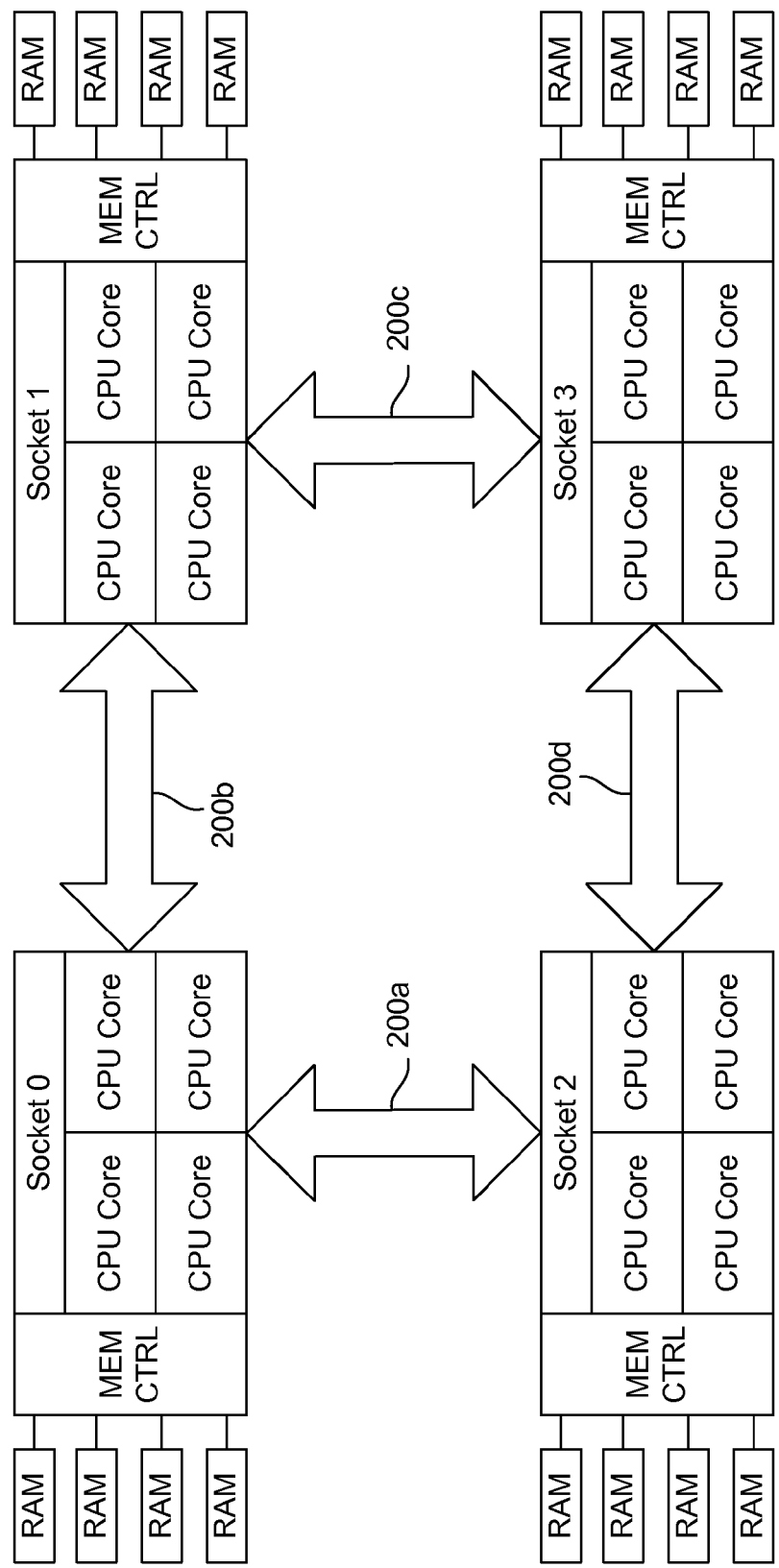
FIG. 2 illustrates a four-node system architecture with non-uniform memory access (NUMA).
Figure 3:
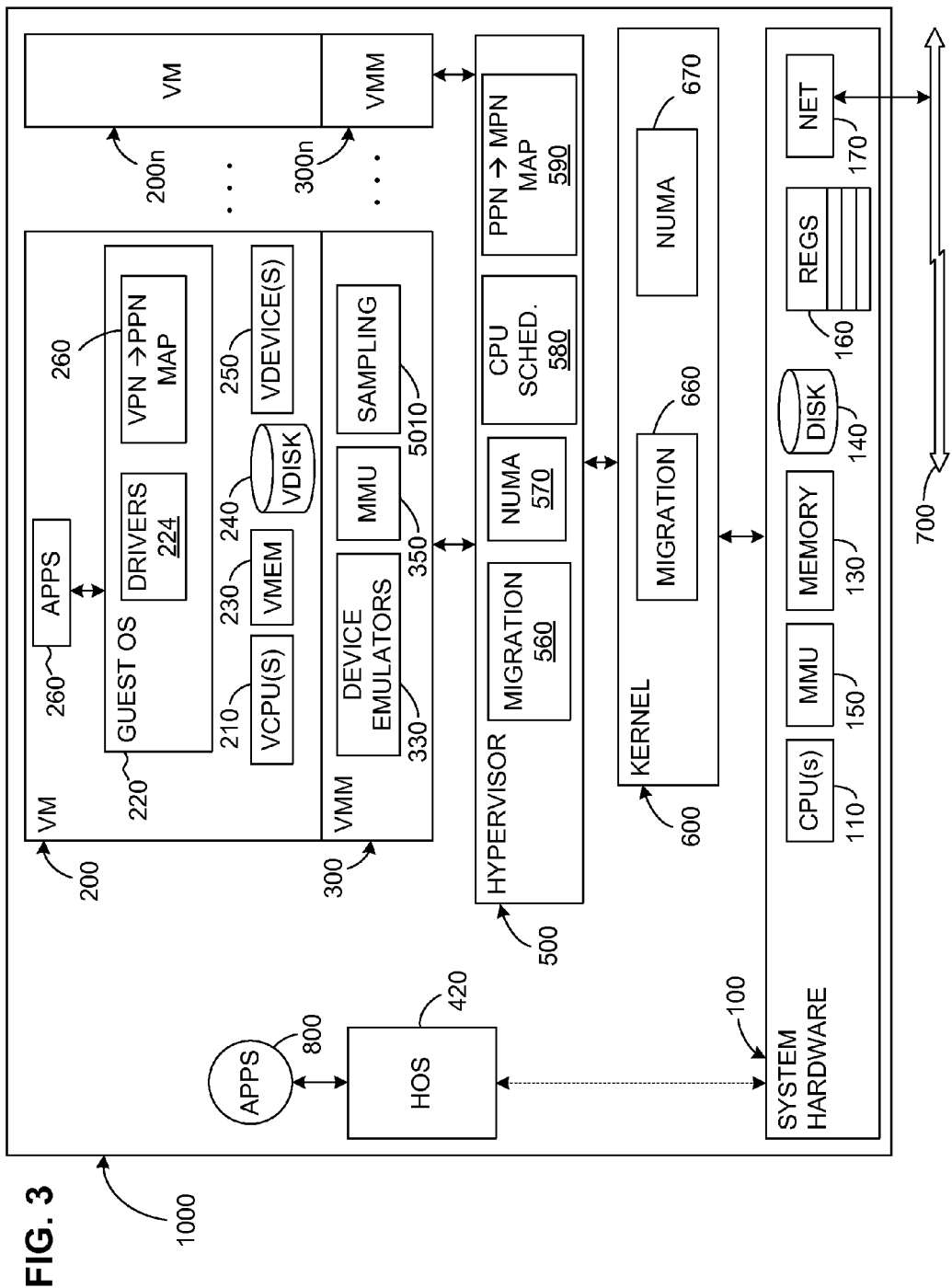
FIG. 3 illustrates the general structure of a virtualized computer system.

Various embodiments related to a novel way to improve locality in NUMA systems, in particular, in virtualized systems, are described more in detail below. Before getting into the particulars, however, it is helpful to understand some underlying features of the context in which certain embodiments may be advantageously used.
Virtualization The challenges of efficient memory allocation are found not only in physical NUMA systems, but also in virtualized computer systems set up on hardware with a NUMA architecture. As is well known in the field of computer science, a virtual machine (VM) is a software abstraction—a "virtualization"—of an actual physical computer system. FIG. 3 illustrates, in part, the general configuration of a virtual machine 200, which is installed as a "guest" on a "host" hardware platform 100.

As FIG. 3 shows, the hardware platform 100 includes one or more hardware processors (CPUs) 110, system memory 130, and a storage device, which will typically be a disk 140. The system memory will typically be some form of high-speed RAM, whereas the disk (one or more) may be a non-volatile, mass storage device. The hardware 100 will also include other conventional mechanisms such as a memory management unit MMU 150, various registers 160, and any conventional network connection device 170 for transfer of data between the various components of the system and a network 700. The host platform will also include its own host operating system 420 on which applications 800 may run.

The design and operation of virtual machines is well known in the field of computer science. Nonetheless, the general characteristics of a virtualized computer system are summarized here for completeness and to establish some properties and components that are used in this invention.

Each VM 200 will typically include at least one virtual CPU 210, a virtual disk 240, a virtual system memory 230, a guest operating system (which may but need not be simply a copy of a conventional operating system) 220, and various virtual devices 250, in which case the guest operating system ("guest OS") will include corresponding drivers 224. All (for a fully virtualized system) or at least most (in a "para-virtualized system) of the components of the VM may be implemented in software using known techniques to emulate the corresponding components of an actual computer.

It does not need to be apparent to the user that any applications 260 running within the VM are running indirectly, that is, via the guest OS and virtual processor. Applications 260 running within the VM will act essentially the same as they would if run on a "real" computer. Executable files will be accessed by the guest OS from the virtual disk or virtual memory, which will simply be portions of the actual physical disk or memory allocated to that VM.

Once an application is installed within the VM, the guest OS retrieves files from the virtual disk just as if they had been pre-stored as the result of a conventional installation of the application.

Some interface is usually required between a VM and the underlying host platform (in particular, the CPU), which is responsible for actually executing VM-issued instructions and transferring data to and from the actual memory and storage devices, usually including one or more levels of address translation/mapping. One common term for this interface is "virtual machine monitor" (VMM), shown as component 300. A VMM is usually a thin piece of software that runs directly on top of a host, or directly on the hardware, and virtualizes all or at least selected ones of the resources of the machine. Among other components, the VMM therefore usually includes device emulators 330. The VMM also usually tracks and either forwards (to some form of operating system) or itself schedules and handles all requests by its VM for machine resources, as well as various faults and interrupts.

Although the VM (and thus the user of applications running in the VM) cannot usually detect the presence of the VMM, the VMM and the VM are typically an operational unit and may be viewed as together forming a single virtual computer.

In some known systems, the VMM is co-resident at system level with a host operating system 420. Both the VMM and the host OS can then independently modify the state of the host processor. The virtual computer in such a configuration is thus fully hosted in that it runs on an existing host hardware platform together with an existing host OS. In other implementations, a dedicated kernel takes the place of and performs the conventional functions of the host OS, and virtual computers run on the kernel. FIG. 3 illustrates both a host OS 420 and a kernel 600 for completeness, although both may not be necessary, depending on the implementation. Moreover, some virtualized systems include a "hypervisor" 500 that acts as the interface between the virtual computers and the kernel or hardware. In some systems, the hypervisor 500 takes the place of and performs the functions of the VMMs 300, and in still others, the functions of the hypervisor are performed by the kernel 600 itself. Again, both are shown merely for the sake of completeness. This invention does not depend on any particular VMM/hypervisor/kernel configuration as long as the various modules described below are included to perform their respective described functions.

In FIG. 3, the kernel 600 serves as the system software for several VM/VMM pairs 200/300, . . . , 200n/300n. Compared with a system in which VMMs run directly on the hardware platform, use of a kernel offers greater modularity and facilitates provision of services that extend across multiple VMs (for example, for resource management). Compared with the hosted deployment, a kernel may offer greater performance because it can be co-developed with the VMM and be optimized for the characteristics of a workload consisting of virtual computers.

As system designers will understand, the various computational and administrative modules shown in FIG. 3 (as well as the other figures) within the general virtualized system 1000, as well as the virtual machines, the VMMs, the hypervisor and the kernel themselves comprise computer-executable instructions that may be provided, stored, loaded and executed from any known computer-readable storage medium, including downloading the code over a network into memory or other storage units, on physical media such as CD-ROM or other disks, on optical or magnetic storage media, on flash or other RAM-based memory devices, etc.

Memory Address Redirection

The most straightforward way for all components in a computer to uniquely identify a memory page would be for them all simply to use a common set of page numbers. This is almost never done, however, for many well-known reasons. Instead, user-level software normally refers to memory pages using one set of identifiers, which is then ultimately mapped to the set actually used by the underlying hardware memory.

When a subsystem requests access to memory, for example, the request is issued usually with a "virtual address," since the memory space that the subsystem addresses is a construct adopted to allow for much greater generality and flexibility. The request is ultimately mapped to an address that is issued to the actual hardware memory. This mapping, or translation, is typically specified by the operating system (OS). The OS thus converts the "virtual" page number (VPN) of the request into a "physical" page number (PPN) that can be applied directly to the hardware. The virtual page number (VPN) is then translated using mappings established by the OS into a physical page number (PPN) based on a page table entry for that VPN in a page table associated with the currently active address space.

In a non-virtualized context, the VPN→PPN mapping is typically performed within a hardware memory management unit (MMU) 150 (see FIG. 3) and is obtained quickly by looking it up in a hardware structure known as a translation lookaside buffer (TLB); if not, a "TLB miss" occurs, and the page tables in memory are consulted to update the TLB before proceeding. The operating system thus specifies the mapping, but the hardware MMU usually actually performs the conversion of one type of page number to the other.

Virtualized computer systems typically employ an additional level of indirection, that is, where a VPN issued by a process within the VM is remapped twice in order to determine which page of the hardware memory is intended. This is because the guest may assume that a given PPN refers to an actual hardware address, but in most cases it will not, but rather, this is an intermediate address that is in turn mapped to the actual hardware address, that is, "machine page numbers" (MPNs). In a virtualized context, the concepts VPN, PPN, and MPN are generally as follows:

VPN: A virtual page number associated with a subsystem running in or on a guest OS.

PPN: A physical page number that refers to a virtualized physical memory space associated with the guest. As is mentioned above, the guest operates as though this PPN refers to actual hardware memory, although it is actually a software construct maintained by the guest software layer. The guest OS specifies mappings from VPNs to PPNs. The guest OS typically maintains the VPN→PPN map 260.

MPN: A machine page number that refers to actual hardware memory 130. An intermediate software layer, for example, the hypervisor 500, specifies mappings from each VM's PPNs to MPNs, using a PPN→MPN map 590. This adds the extra level of indirection, with two address translations (mappings) instead of one: a VPN is translated to a PPN using the guest OS mappings, and then this PPN is mapped to an MPN. In order to eliminate one mapping operation while still maintaining the extra degree of addressing indirection, the intermediate software layer may instead (or, if needed, in addition) maintain a separate page table from VPNs to MPNs, so that the hardware MMU 150 can translate VPNs directly to MPNs.

Migration

One of the key advantages of virtualization is the ease of management and the ability to do such tasks as maintenance, load balancing, etc., with minimal downtime, and one of the primary tools to accomplish many of these tasks is "migration". As the name implies, "migrating" a VM involves moving it, at least functionally, from one physical host to another. One of the earliest successful techniques for migrating VMs is described in U.S. Pat. No. 7,484,208 (Nelson), which not only enabled migration of a VM from a source to a destination platform, but did so while the source VM was still running, thereby reducing the downtime experienced by the user usually to an unnoticeable level.

Figure 4:
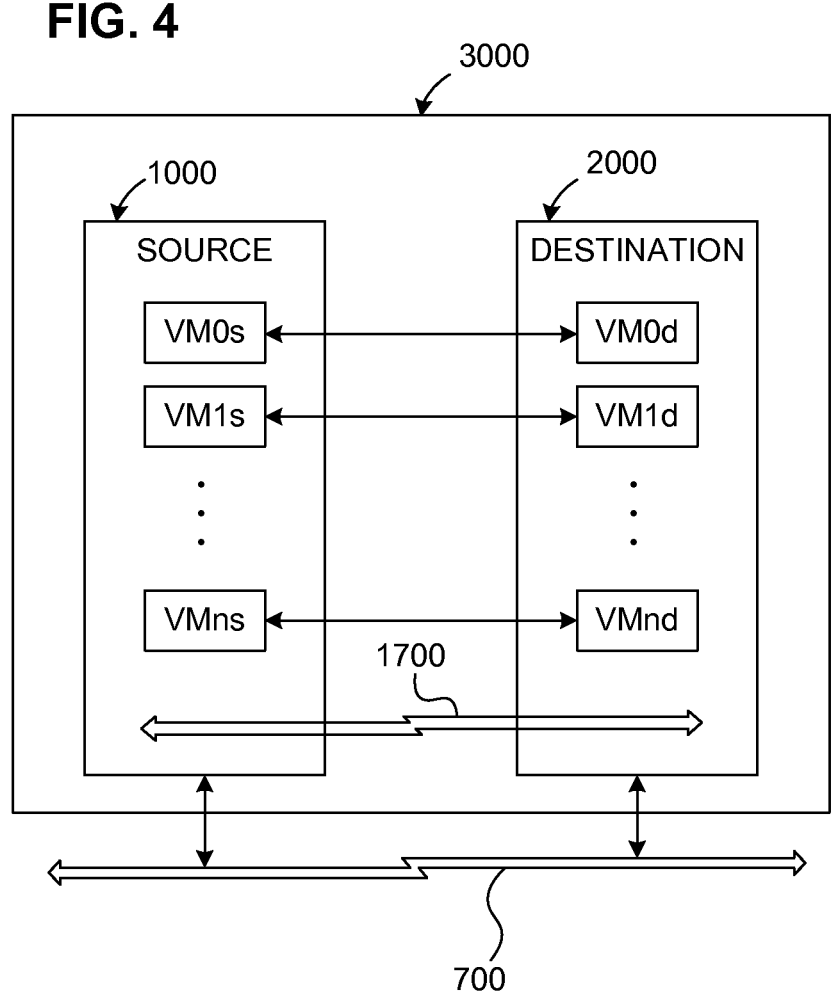
FIG. 4 illustrates virtual machine migration.

The mechanisms for migrating virtual machines from one host to another are thus well known. VMs may be migrated to run on different processors or even different hardware platforms, including in an SMP architecture. Also well known is that the physical location of a VM's data and code can be changed, and through proper address remappings, the VM will still be able to access the appropriate memory contents. In FIG. 3, the hypervisor 500 and kernel 600 are shown as including respective migration components 560, 660 for migrating VMs. FIG. 4 illustrates how virtual machines VM0s, VM1s, . . . , VMns, can be migrated from a source platform/processor/core 1000 to a destination platform/processor/core 2000 as virtual machines VM0d, VM1d, . . . , VMnd over a bus or network that may be internal 1700 or external 700 to the overall infrastructure 3000. Note that it is not necessary for the source VMs all to be on a single physical host, and the same applies to destination VMs as well.

NUMA in Virtualized Systems

Figure 5:
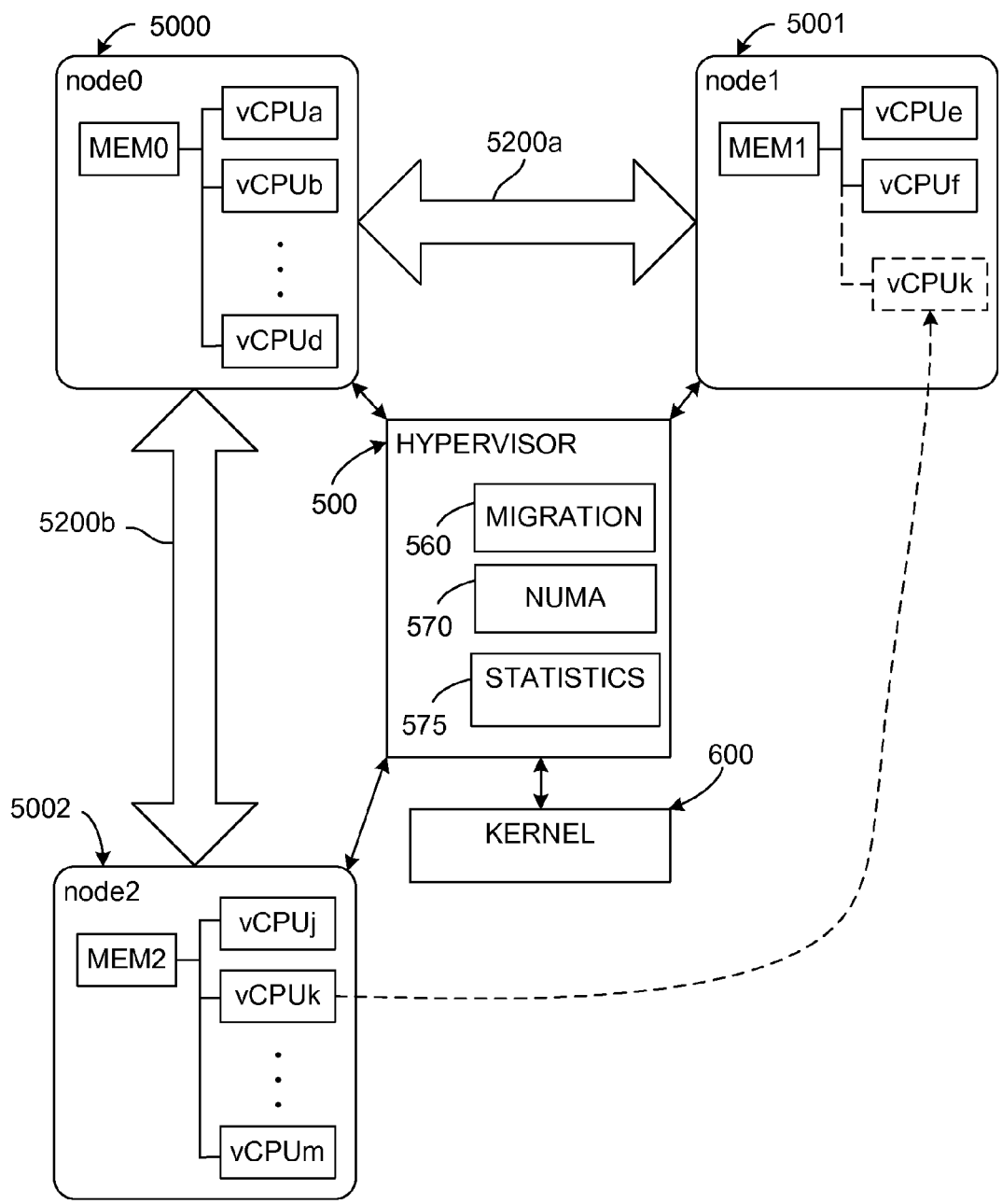
FIG. 5 illustrates a three-node NUMA system that includes virtual machines.

Virtual computers may also run on NUMA systems, and as such will face the same challenges of memory locality as with "regular" NUMA system. In particular, the hypervisor faces the task of scheduling the set of virtual CPUs (vCPUs) across the available physical CPUs and distributing execution time on the vCPUs among various processes. In the context of virtualization, a "NUMA client" is a group of virtual CPUs in a virtual machine that are NUMA-managed as a single entity. As FIG. 5 illustrates, virtual CPUs may be grouped into physical NUMA nodes 5000, 5001, 5002, just as physical processor cores. Thus, virtual CPUs vCPUa, vCPUb, . . . , vCPUd are shown in node 0; vCPUe and vCPUf are shown as initially being the only ones in node 1; and vCPUj, vCPUk, . . . , vCPUm are shown as being in node 2. By way of example only, FIG. 5 illustrates two high-speed interconnects 5200a and 5200b connecting node 0 with node 1 and node 2, respectively. Merely for the sake of clarity, the various VMMs and other components in and associated with each VM (see FIG. 3) are not repeated in FIG. 5.

Common optimizations in hypervisors include static approaches, such as assigning a "home node" to VMs, and using round-robin initial placement at VM boot time. Another static technique is to always allocate memory locally wherever a vCPU is currently scheduled. Dynamic optimizations include migrating memory towards a VM's home node at runtime, or migrating vCPUs of a VM for locality reasons. These techniques work well for small VMs. However, VMs might not fit into a node for memory reasons or because of being configured with more vCPUs than are available on a single node. Such VMs are referred to as "wide VMs" and appear as multiple "NUMA clients" to the kernel 600. Each NUMA client may be considered as a single VM for NUMA optimization purposes.

In the case of a wide VM, if a component is not exposed to the guest OS to provide an explicit interface (a vNUMA component) to the NUMA scheduler, the guest OS will not be aware that it is running on a NUMA system. As such, even if the OS and the workload it is running are NUMA-optimized, these optimizations will not come into play. In such a scenario, multithreaded workloads with shared data structures are likely to end up with threads being scheduled on different nodes, and sharing pages across the node interconnect. This will lead to performance degradation and not realize the potential of the underlying NUMA architecture.

Even with vNUMA exposed, if the workload and/or the guest OS is not NUMA-optimized, sharing across nodes is likely to occur. Furthermore, a VM may fit in a node on one host system and thus not have vNUMA enabled, but may subsequently migrate to a new host on which it spans multiple nodes. Again, this will lead to a decrease in performance, and without a mechanism for the hypervisor to detect data sharing, it will not be able to act on the problem.

In order to make informed decisions on NUMA memory placement and CPU scheduling, it is therefore important to collect accurate data on current placement of memory and access patterns, so as to predict the level of locality that can be achieved in the system, and identify which possible actions exhibit the lowest cost-benefit ratio.

NUMA Scheduling Using Statistical Sampling of Memory

Certain embodiments as will be described below relate to novel methods and system software structures for locality profiling and analysis. In particular, one embodiment provides a direct method for the hypervisor to detect inter-vCPU sharing in a VM, and to ensure that most accesses occur locally. The method uses statistical sampling of memory and tracking the occurrences of page faults to sampled pages. One embodiment provides an estimate of how many pages are shared between two vCPUs, and at what frequency and ratio—for example, whether each vCPU contributes 50% of all accesses, or if a more skewed ratio exists towards one member of a pair. The method also provides the kernel with a way to estimate relative frequency of access by a vCPU to a NUMA node, which can be a useful metric when two nodes contain the same number of active pages, but one node's memory is "hotter." The examples below relate to an embodiment in which the system determines whether to migrate a vCPU to a different node, and in such case which vCPU. It should be understood, however, that the techniques described here may be used for locality improvement for any software entity—even in a non-virtualized context—that can be migrated from one NUMA node to another, and whose memory accesses can be traced and associated with that entity. For example, even non-virtualized systems include processes or "Application Pools" (terminology of Microsoft Corp.) that require or can benefit from a more efficient determination of processor affinity.

Figure 6:
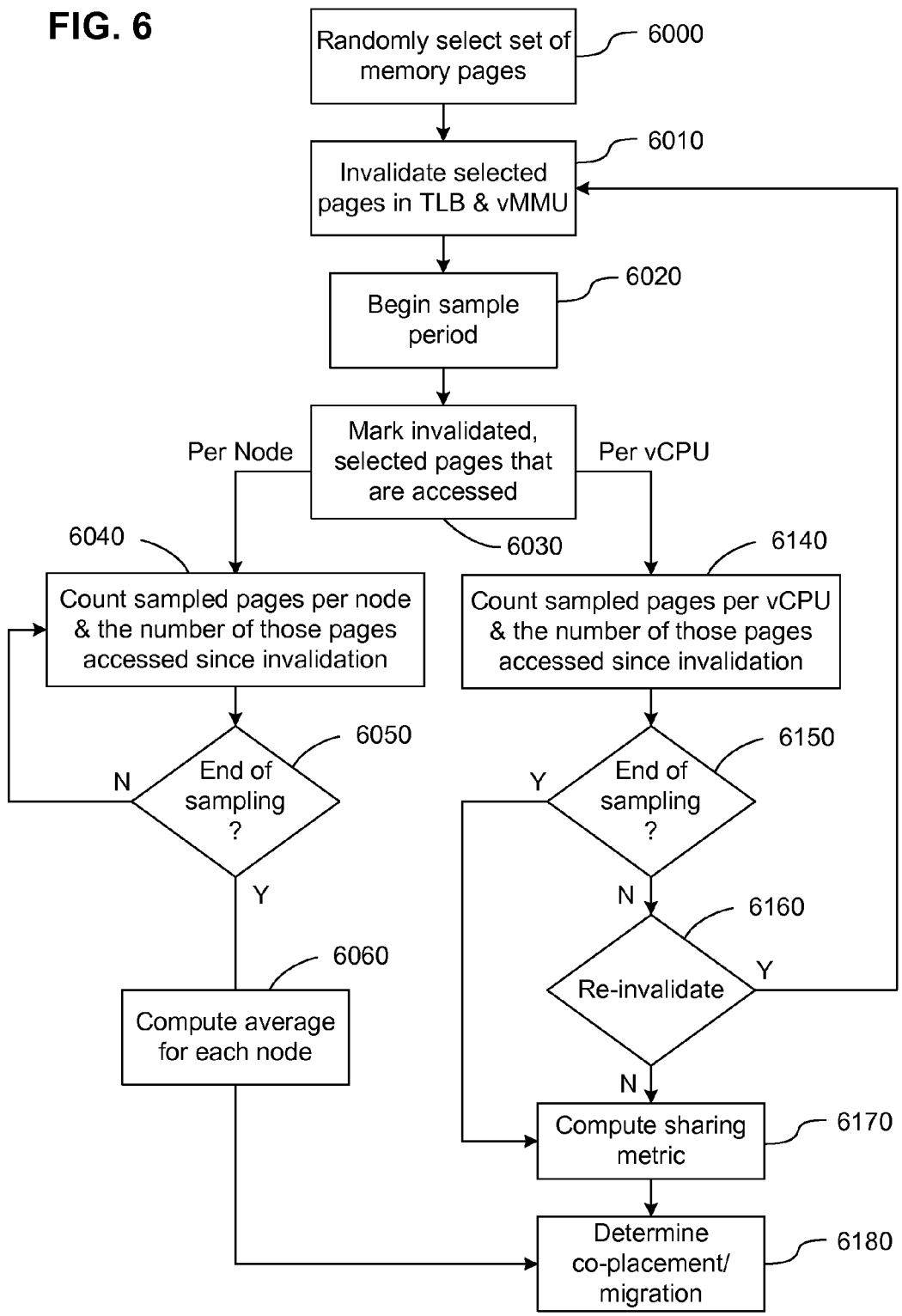
FIG. 6 is a flowchart that illustrates a per-node and per-vCPU work flow for NUMA scheduling based on sampling of memory accesses.

The central technique (illustrated in FIG. 6) comprises first randomly selecting a set of memory pages (6000). The number of pages sampled can be configurable or variable, and may be chosen using any desired probability distribution, e.g., a uniform distribution. The mappings of those memory pages are then invalidated (6010) in the TLB (Translation Lookaside Buffer) and the virtual MMU (Memory Management Unit) 350 and the sampling period starts (6020). This forces the CPUs to page-fault when accessing those pages. The page faults are then processed by the respective VMM in the normal manner. In the page fault code path, the VMM or other system-level software component can mark sampled pages (6030) as accessed. In particular, the VMM can record the access as originating from a specific vCPU (or other migratable process of interest), namely, the vCPU that is executing the page fault code path. It will also be known whether the access is a read or a write. At the end of a sampling period, the results may be extrapolated for a more complete picture of the spread of active pages across nodes. This provides a good per-node estimate of memory activity, which can then be used as a heuristic for VM migration. In particular, a VM may be migrated to a node that increases memory locality for that VM. For example, FIG. 5 illustrates (with the dashed arrow) vCPUk as having been migrated from node2 to node1.

Upon page faulting, the accesses are logged for later aggregation. Statistical sampling yields detailed information for each VM and its constituent virtual CPUs (vCPUs). With aggregate data compiled, the system can quickly respond to changes in locality, which allows more precise fine-tuning of present and future data and code placement, detection of candidate pages and VMs for migration across the system, and other NUMA optimizations. Different aspects of the invention enable estimation of per-node memory activity and/or estimation of per-vCPU memory activity. As with many forms of real-time sampling, the more the system samples, the more accurate information, but there will be a trade-off: to achieve greater accuracy, there will be a cost to performance and reaction speed. In practice, memory migration is costly operation, so it may be preferable not to act too quickly (to avoid quick bouncing back-and-forth) and to observe data until at least a roughly steady state is reached before making migration decisions. Skilled programmers are familiar with such trade-offs and will choose sampling periods, sizes and rates suitable for their given implementation of this invention.

To estimate memory activity per-node, it should be noted (see discussion above relating to memory access redirection) that the kernel 600 is aware of the mappings of each VM physical page number (PPN) to a machine page number (MPN). It also knows which node an MPN belongs to. At the end of each sampling period (6050), a sampling module 5010 (see FIG. 3) in the VMM may make a system call into the hypervisor 500, which includes a statistics module 575 that counts (6040) how many pages are sampled from each node, and how many of those were accessed since being invalidated. The statistics module 575 may then compute an average (6060) for each node. One type of average that may be used is an exponentially weighted moving average (EWMA), with the maximum of all values providing a final activity estimate. Note that, depending on the implementation, the statistics module 575 may instead reside within the kernel 600.

There are known sampling techniques in other, non-NUMA contexts, to determine which pages of a given memory set are actively being accessed. In one example, one hundred pages are randomly sampled every minute to form a sample set. A sample set is retired after four minutes, such that the four most recently sampled sets are maintained for analysis at any given time. Statistics, in particular, the number of pages accesses, are then compiled for each set individually, as well as the four corresponding ratios (number_of_accessed_pages)/(sample_set_size_in_pages). The maximum of these four ratios is then taken to be the "active" or "current" ratio. One advantage of this scheme is that if the maximum ratio increases, the system will react quickly, whereas a decrease will have an effect after about four minutes. Such a sampling scheme may be used for embodiments herein, for per-node, per-VM analysis, although of course the sampling parameters (such as number of periods, sample size, type of averaging used, etc.) may be altered according to known considerations and weighted averaging may be used for smoothing.

To maximize locality for wide VMs it is typically beneficial to collect per-vCPU data, since different vCPUs may be homed on different nodes. Similarly, per-vCPU estimates may be useful when running a VM on a virtualized NUMA platform (vNUMA), with a guest and applications that are not NUMA-optimized. In that case, the hypervisor may move memory around to boost performance.

Although possible, it will in general not be necessary to collect data for every active page in a VM; rather, computation of the general trend in memory usage will typically suffice. Trend data can be applied, for instance, to ration the allocations of VMs depending on their entitlement in a NUMA-aware fashion.

For VMs that span more than one node, it is typically not sufficient to gather VM-wide per-node access pattern information. Rather, the relevant information is the per-vCPU per-node statistics, since memory local to one vCPU may be remote to another. The sampling mechanism is therefore preferably extended to provide per-vCPU data. This can be done by counting sampled pages per vCPU (6140) and how many of those have been accessed since the most recent invalidation (6150) but invalidating pages' mappings not once, but rather more and even many times (6160) over the sampling period. In this way, multiple accesses from different vCPUs can be detected to provide per-vCPU estimates.

In order to record more than one access to the chosen set of memory pages, the system may periodically re-invalidate (6160) the mappings of sampled pages. This can be done at fixed time intervals or variable ones, for example depending on the amount of activity witnessed. The invalidation frequency will be instrumental in the number of page faults induced, so it is advantageous to find a reasonable compromise between performance and accuracy of the data. One option is to re-invalidate only those pages that have been accessed since the most recent invalidation.

In order to gather per-vCPU statistics, the page sample sets may thus be periodically re-invalidated. Many accesses to a page (from the same or different vCPUs) can then be recorded over one sample period. Each sample set may be extended with a hash table that maps page numbers to arrays containing per-vCPU counts. Upon a fault to a sampled page, the faulting vCPU attempts to find the page in one of the sample set hash tables, then increments a count corresponding to its vCPU number (vCPUs are typically numbered sequentially), as well as mark the page as accessed if this is the very first sampled access, in order to maintain the previous functionality. At the end of each period, the same statistics as for per-VM and per-node estimates may be computed.

Time can be divided into sampling periods. At the end of each period, new pages may be selected randomly and access counts reset. It is also possible to keep the same pages for several periods and maintain moving averages of their end-of-period access counts, which would lead to smoother changes in access rate and sharing estimates over time.

This data can be used for vCPU co-placement—in other words, scheduling two vCPUs on the same socket (e.g., the same node), for example, so that they share a last-level cache. Upon scheduling a vCPU, say, vcpu0, a CPU scheduler 580 in the hypervisor (see FIG. 3) can consider a sharing weight (6170), which will order other vCPUs by the amount of memory they share with vcpu0, and the frequency of the accesses. This sharing weight between vcpu0 and another vCPU vcpu1 may then be computed as the sum of the average of vcpu0 and vcpu1's access counts (complied for a plurality of sample sets) to each page. One example of a suitable averaging method in this case is the harmonic mean of the two counts.

One advantage of the harmonic mean is that it de-emphasizes relatively large outliers. For example, assume a memory page page1 has (50, 50) accesses from (vcpu-a, vcpu-b), respectively, and page2 has (100,1) accesses from (vcpu-a, vcpu-b). The sharing metrics using the unweighted harmonic mean would be 50.0 for page1 and about 1.98 for page2; this is a useful result, since page1 is more highly shared than page2. The geometric means would be 50.0 and 10.0, which is still a reasonable and useful metric. The arithmetic mean, however, would be 50.0 for both, which thus provides no useful information about the significant disparities in actual access counts. Of course, other metrics may also be used.

If A(vcpu, page) is the number of accesses by vcpu to page, then one example of a useful sharing metric may thus be:
Overlap(vcpu0, vcpu1):
 foreach page:
  result+=2*A(vcpu0, page)*A(vcpu1, page)/(A(vcpu0, page)+A(vcpu1, page))
 return result After computing the above metric for each pair (vcpu0, vcpu*), the CPU scheduler may choose to co-place (6180) vcpu0 with the vCPU for which it obtained the highest sharing value. The overlap for each pair does not have to be computed often, especially since sample page access counts are preferably only aggregated at the end of a sampling period. Moreover, the overlap metric can be computed off any critical path, in a process that is scheduled when CPU cycles are available. It would also be possible to preserve historical data over a plurality of sample sets such that overlap values can also be averaged over time so they will remain more stable.

The kernel 600 will typically sees a wide VM as multiple NUMA clients. For example, consider a 1 TB VM with 16 vCPUs. By way of example, the kernel may logically split this VM into two NUMA clients: vCPUs 0-7 comprising the first 512 GB as a first NUMA client, and vCPUs 8-15 and second 512 GB as a second NUMA client. The NUMA scheduler 570 in the kernel/hypervisor (whether implemented as separate components or not) may then schedule these NUMA clients independently, similar to non-wide VMs, that is, each NUMA client may be assigned to a home node regardless of the home nodes other NUMA clients are assigned to. All vCPUs belonging to a NUMA client may then be scheduled on the NUMA client's home node. Similarly, memory belonging to a NUMA client may have affinity to the NUMA client home node. Assume the VM migrates to a new machine and it is possible to place both NUMA clients of the VM in a single node. The vCPU sharing statistics may then be used to guide the decision of determining the home node for the NUMA clients.

Note that typically each NUMA client will be exposed to the guest OS, so an intelligent guest OS/application scheduling may minimize sharing between NUMA clients. In such a scenario, the system (such as ESX) may decide to place a VM's NUMA clients in different nodes for load-balancing reasons.

The inter-vCPU sharing metric can also be used as a measure of sharing between all vCPUs of two NUMA clients of a VM. If heavy sharing is detected, and the two clients fit within a NUMA node, one of them can be migrated so that their vCPUs are naturally co-placed most of the time.

In systems that consist of hundreds of nodes, it may also be beneficial to simply migrate one of the clients closer to the other, even if it is not on the exact same node. For example, by migrating a client to a node that has a high-speed interconnect with another client, the need for hopping may be reduced. The reduced latency between the two will still lead to an improvement in performance.

Lastly, if sharing in equal proportion is detected between vCPUs of two different NUMA clients of a VM, there is no "correct" node on which to locate the shared pages. In such a case, it might be useful to reduce the rate of page migrations towards the clients' home nodes, since those migrations will favor one but disfavor the other, and ultimately won't contribute to an increase in performance. There are, however, uses of per-node, per-VM statistics, even unrelated to the issue of page access frequency—the techniques described here may be used to help inform even other forms of resource—especially, memory, migration in NUMA systems based on the statistics. For example, in some systems, such as the ESX system of VMware, NUMA memory migration is initiated only when there is free memory in the destination node. So consider the following scenario: Assume VM1 is a small VM and can fit in single NUMA node, but its memory is spread out 50-50 between two NUMA nodes and both nodes are full because of allocations from other VMs. Assume that the other VMs are completely idle. Now assume also that the per-node, per-VM statistics indicate that VM1 has 40% active memory in its home-node node0 and 60% active memory in node1. Since neither node has much free memory, the supervisory system (such as ESX) will not initiate any memory migration. In accordance with the principles of this invention, however, based on VM1's per-node, per-VM statistics, the kernel or hypervisor could migrate some idle memory from node0 to node1 in order to make space for VM1's active memory. Moving idle memory from node0 to node1 and thereby bring active memory from node1 to node0 would increase the locality of the active memory and should thus improve performance.

Sampled access counts as described above may also be used as a proxy for page access frequency. When considering migration of a NUMA client to a new home node, active memory is taken into account. Access frequency is valuable, as there might be two nodes with equal numbers of active pages, but one may be accessed much more frequently. In that case, it will be beneficial to the client's performance to migrate to the relatively more active node. The decision can be made, for example, by using a moving average (weighted or not) of sample page access counts when predicting the incremental performance change (delta) the migration would induce. As just one example, the performance delta can be computed as follows, for a system with N nodes, when moving from node src (source) to node dst (destination):

A(n)=number of active pages on node n
 R(n)=average number of sampled accesses per page residing on node n
 L(n, m)=latency when accessing node m from node n
 Delta (src, dst)=SUM {from n=1 to N} of:
  A(n)*R(n)*[L(src, n)−L(dst, n)]

The node with the largest positive delta may then be assumed to lead to the highest performance improvement. A threshold may then be defined, above which that NUMA client (a process, in general, including a process such as a vCPU within a wide VM, or an entire VM in the illustrated examples) is migrated to the destination node.

Certain embodiments as discussed above have several benefits, which include:
- provides a direct estimate of inter-vCPU sharing;
- provides heuristics to help decide about co-placement of vCPUs that actively share memory to increase performance, by using the same last-level cache and avoiding the use of the high-latency node interconnect;
- enables the use of inter-vCPU sharing estimates as factors in NUMA client migration decisions; and
- provides a direct per-node access frequency estimate, which is valuable in NUMA client migration decisions.

In the description of the various embodiments above, it is assumed that memory is arranged and allocated in units of pages, since this is at present the most common arrangement. It is not the only possible allocatable unit of memory, however, and skilled programmers will readily understand how to adapt the various techniques in the different embodiments to other allocatable memory units.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

The invention claimed is:

1. A method for managing memory in a system, said system including a plurality of software entities that each access the memory and having a non-uniform memory access architecture (NUMA) with a plurality of nodes, the method comprising:
   - selecting a sample set of memory units;
   - invalidating the sample set of memory units and detecting accesses by any of the software entities to the invalidated memory units;
   - computing a metric as a function of a proportion of accessed memory units relative to the sample set of memory units; and
   - associating at least one of the software entities with one of the nodes based at least in part on the corresponding metric so as to increase memory locality of the associated software entity.

2. The method of claim 1, in which the software entities are virtual CPUs of virtual machines, the method further comprising:
   - invalidating the sample set of memory units by invalidating the sample set in a translation look-aside buffer and memory management unit associated with each respective virtual machine;
   - detecting accesses to the invalidated memory units by sensing page faults; and
   - migrating the virtual machines between nodes according to their respective metrics.

3. The method of claim 2, further comprising periodically re-invalidating the sample set of memory units for each of a plurality of sample periods and, for each virtual CPU, compiling per-virtual CPU access statistics as the metrics for each sample period.

4. The method of claim 3, further comprising:
   - computing an estimate of pair-wise relative sharing of memory for pairs of the virtual CPUs; and
   - scheduling pairs of the virtual CPUs that have relatively higher relative sharing on the same node.

5. The method as in claim 4, in which the estimate is an average of access counts to each of the invalidated memory units by the pairs of virtual CPUs.

6. The method as in claim 5, in which the average is a harmonic mean.

7. The method as in claim 1, comprising,
   - for each node, for at least one of the entities, estimating a degree of memory activity by computing pair-wise node performance metrics for that entity, each node performance metric being computed as a function of a number of active pages on each node, an average number of sampled accesses per page residing on each node, and a measure of access latency between the pairs of nodes;
   - identifying the node having the maximum performance metric; and
   - migrating the entity from a current node on which it is currently located to the node having the maximum performance metric.

8. The method as in claim 1, further comprising selecting the sample set of memory units randomly.

9. A system for managing memory in a computer having a non-uniform memory access architecture (NUMA) with a plurality of nodes, comprising:
   - a plurality of software entities that each access the memory;
   - a supervisory software system controlling allocation of and access by the software entities to the memory, said supervisory software system including:
   - a statistics unit selecting a sample set of memory units;
   - a memory management component invalidating the sample set of memory units and detecting accesses by any of the software entities to the invalidated memory units;
   - said statistics unit computing a metric as a function of a proportion of accessed memory units relative to the sample set of memory units; and
   - said memory management component associating at least one of the software entities with one of the nodes as a function of the corresponding metric so as to increase memory locality of the associated software entity.

10. The system of claim 9, in which the software entities are virtual CPUs of virtual machines, in which:
    - invalidating the sample set of memory units by invalidating the sample set in a translation look-aside buffer and memory management unit associated with each respective virtual machine;
    - said memory management unit is provided for detecting accesses to the invalidated memory units by sensing page faults; and
    - the supervisory software system further includes a migration component for migrating the virtual machines between nodes according to their respective metrics.

11. The system of claim 10, in which the supervisory software system is further provided for periodically re-invalidating the sample set of memory units for each of a plurality of sample periods and the statistics unit is provided for compiling, for each virtual CPU, per-virtual CPU access statistics as the metrics for each sample period.

12. The system of claim 11, in which the supervisory software system is further provided for computing an estimate of pair-wise relative sharing of memory for pairs of the virtual CPUs; and for scheduling pairs of the virtual CPUs that have relatively higher relative sharing on common nodes.

13. The system as in claim 12, in which the estimate is an average of access counts to each of the invalidated memory units by the pairs of virtual CPUs.

14. The system as in claim 9, in which,
the statistics unit is further provided, for each node, for at least one of the entities, estimating a degree of memory activity by computing pair-wise node performance metrics for that entity, each node performance metric being computed as a function of a number of active pages on each node, an average number of sampled accesses per page residing on each node, and a measure of access latency between the pairs of nodes; and for identifying the node having the maximum performance metric; and
the migration component is further provided for migrating the entity from a current node on which it is currently located to the node having the maximum performance metric.

15. The system as in claim 9, in which the statistics component is further provided for selecting the sample set of memory units randomly.

16. A non-transitory computer-readable storage medium having data stored therein representing software executable by a computer, said system including a plurality of software entities that each access a memory arranged in memory units and said system having a non-uniform memory access architecture (NUMA) with a plurality of nodes, said storage medium including:
   instructions for selecting a sample set of the memory units;
   instructions for invalidating the sample set of memory units and detecting accesses by any of the software entities to the invalidated memory units;
   instructions for computing a metric as a function of a proportion of accessed memory units relative to the sample set of memory units; and
   instructions for associating at least one of the software entities with one of the nodes as a function of the corresponding metric so as to increase memory locality of the associated software entity.

17. The storage medium of claim 16, in which the software entities are virtual CPUs of virtual machines, the storage medium further including:
   instructions for invalidating the sample set of memory units by invalidating the sample set in a translation look-aside buffer and memory management unit associated with each respective virtual machine;
   instructions for detecting accesses to the invalidated memory units by sensing page faults; and
   instructions for migrating the virtual machines between nodes according to their respective metrics.

18. The storage medium of claim 17, further comprising instructions for periodically re-invalidating the sample set of memory units for each of a plurality of sample periods and, for each virtual CPU, compiling per-virtual CPU access statistics as the metrics for each sample period.

19. The storage medium of claim 18, further comprising:
   instructions for computing an estimate of pair-wise relative sharing of memory for pairs of the virtual CPUs; and
   instructions for scheduling pairs of the virtual CPUs that have relatively higher relative sharing on common nodes.

20. The storage medium as in claim 19, in which the estimate is an average of access counts to each of the invalidated memory units by the pairs of virtual CPUs.

21. The storage medium as in claim 20, in which the average is a harmonic mean.

22. The storage medium as in claim 16, comprising,
for each node, for at least one of the entities, instructions for estimating a degree of memory activity by computing pair-wise node performance metrics for that entity, each node performance metric being computed as a function of a number of active pages on each node, an average number of sampled accesses per page residing on each node, and a measure of access latency between the pairs of nodes;
identifying the node having the maximum performance metric; and
migrating the entity from a current node on which it is currently located to the node having the maximum performance metric.

23. The storage medium as in claim 16, further comprising instructions for selecting the sample set of memory units randomly.

24. A method for managing memory in a system, said system including a plurality of software entities that each access the memory and having a non-uniform memory access architecture (NUMA) with a plurality of nodes, the method comprising:
   selecting a sample set of memory units;
   invalidating the sample set of memory units and detecting accesses by any of the software entities to the invalidated memory units;
   for each of a plurality of the software entities, computing a metric as a function of a proportion of accessed memory units relative to the sample set of memory units, said metric indicating a measure of per-node active memory of the plurality of the software entities;
   migrating the active memory of at least one of the software entities from a first one of the nodes to a second one of the nodes, with which the at least one software entity is running, thereby increasing a percentage of active memory of the at least one of the software entities on the second node.

25. The method as in claim 24, in which the software entities are virtual CPUs of virtual machines.

* * * * *